Sept. 4, 1934.   C. C. JACOBSON   1,972,709
WELDLESS CABLE SHEATH EXTRUSION APPARATUS
Filed Sept. 10, 1932   3 Sheets-Sheet 2

Sept. 4, 1934.　　　C. C. JACOBSON　　　1,972,709
WELDLESS CABLE SHEATH EXTRUSION APPARATUS
Filed Sept. 10, 1932　　　3 Sheets-Sheet 3
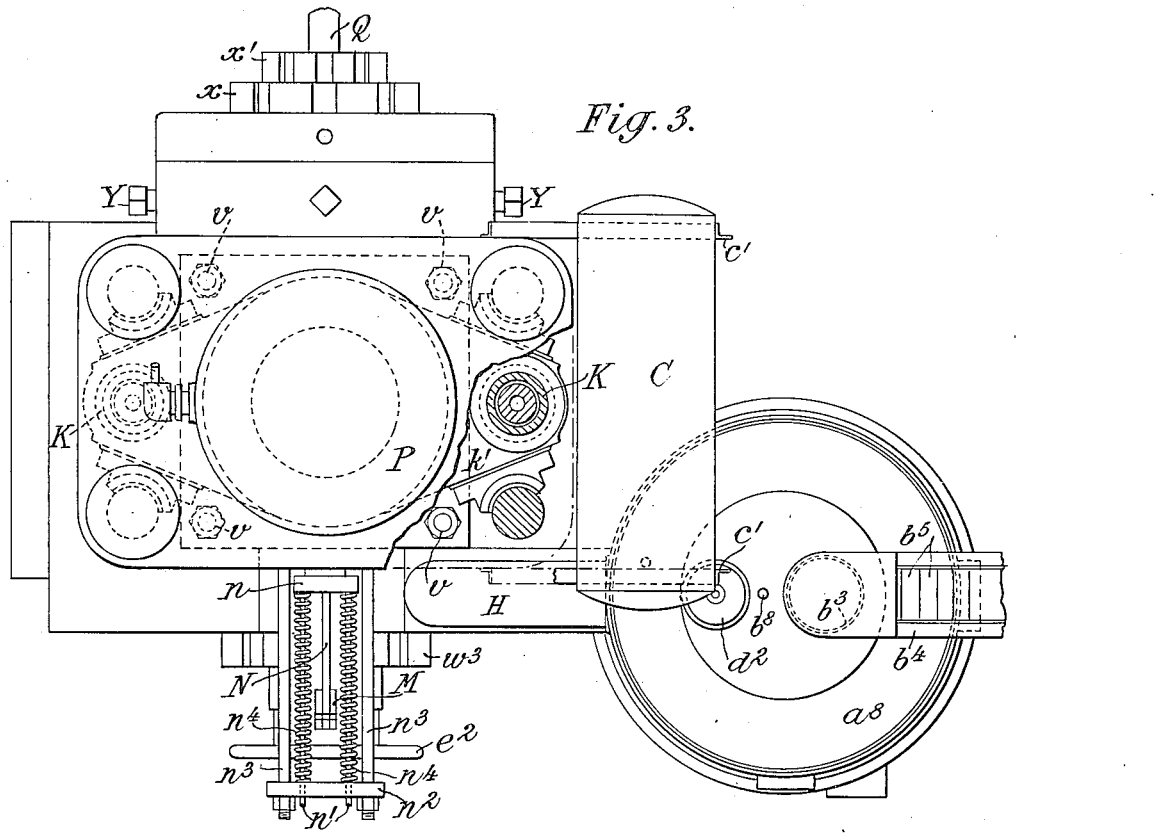
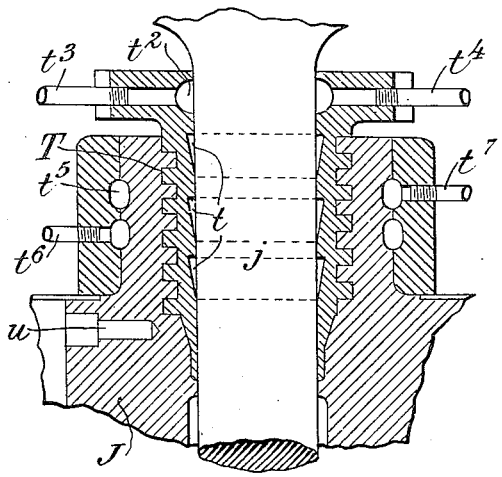
INVENTOR
Conrad C. Jacobson,
BY
Fraser, Myers & Manley
ATTORNEYS.

Patented Sept. 4, 1934

1,972,709

UNITED STATES PATENT OFFICE 1,972,709

WELDLESS CABLE SHEATH EXTRUSION APPARATUS

Conrad C. Jacobson, Glen Ridge, N. J., assignor to John Robertson Co., Inc., Brooklyn, N. Y., a corporation of New York Application September 10, 1932, Serial No. 632,556

6 Claims. (Cl. 207—4)

The present invention relates to a weldless cable sheath extrusion apparatus and to the method of producing weldless cable sheath.

In cable sheathing extrusion presses as heretofore constructed, the metal being extruded is forced in the solid state through the extrusion chamber of the die-block around a core, in the course of which action the metal is caused to divide into two or more streams, which, under the pressure of the extruding operation, are reunited and welded together. At its line or lines of reuniting or welding, the extruded sheath has a joint or joints, which, although imperceptible to the naked eye, are often defective and give rise to failure of the covered cable. Joints are also formed in the cable sheath at spaced longitudinal points thereof due to the intermittent stopping of the press during the charging thereof with metal, and these joints also occasionally give rise to cable failures. The aforementioned joints of both types prove to be particularly objectionable when the metal being extruded, for example, lead and lead alloys, contain oxides of the metals. Hence the prevention of the formation of such oxides has been the goal of engineers when designing such presses, for many years.

The present invention contemplates the provision of means and a method whereby the cause of cable failures due to joint defects in the cable sheaths is overcome by the elimination of both the longitudinal and transverse joints or welds in such cable. This I accomplish by the provision of an extrusion press wherein the sheathing metal is maintained in the extrusion chamber in a liquid or molten state while flowing around a master core toward the extrusion die, said metal being solidified under pressure in the region somewhat in advance of the extrusion die as the metal is forced toward said die. The invention also embodies various novel combinations and sub-combinations of elements whereby the desired results are obtainable, all of which will be better understood from the detailed description thereof which follows, when considered in conjunction with the accompanying drawings showing a preferred embodiment of my invention, and wherein:—

Fig. 3 is a top plan view of the apparatus, parts thereof being shown in section.

Fig. 4 is an enlarged longitudinal section of a portion of the extrusion cylinder showing the construction of the self-sealing gland therein.

Figure 1:
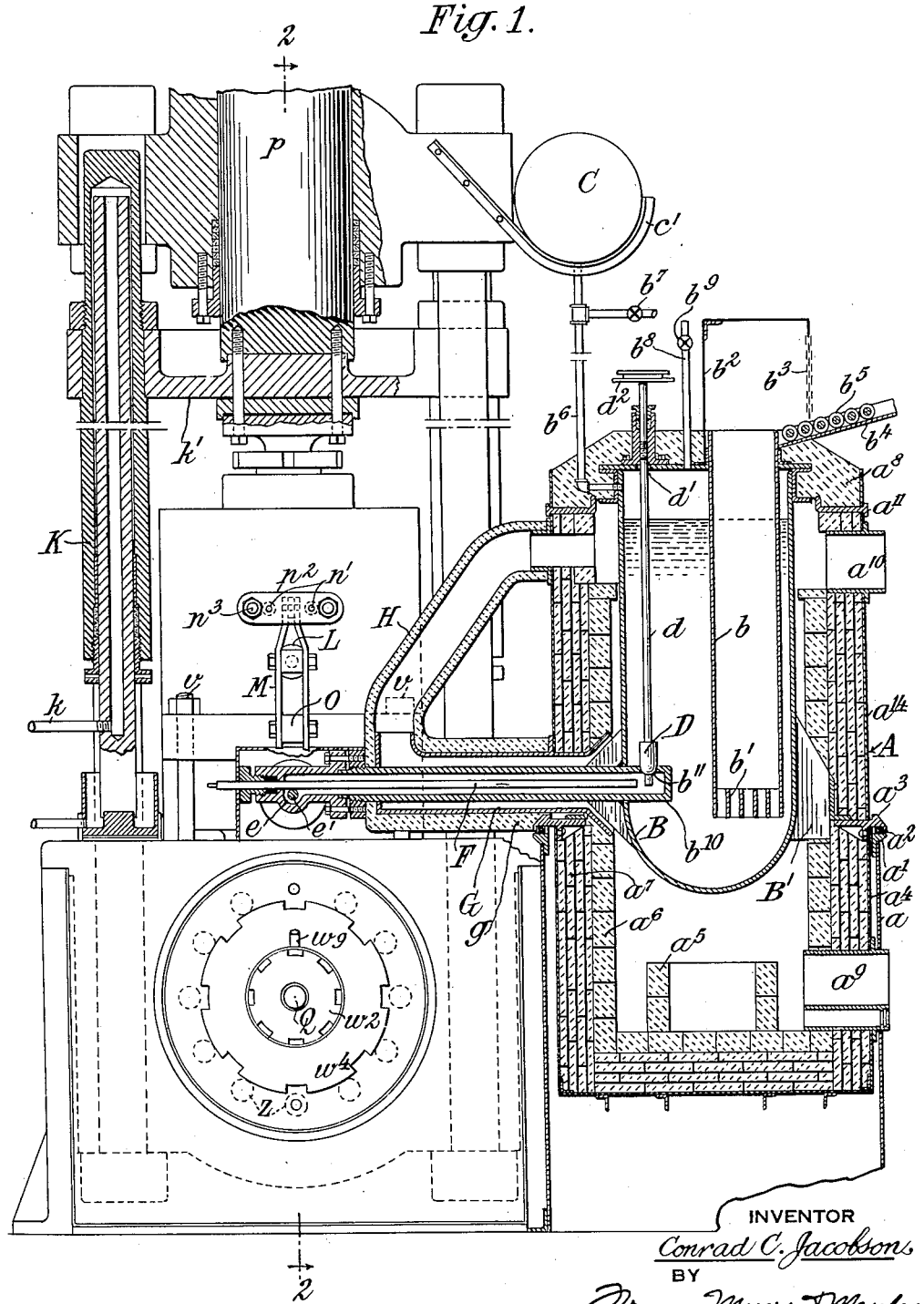
Figure 1 is a vertical section of the extrusion apparatus embodying my invention, parts thereof being shown in elevation.

Referring to the drawings, let A indicate a furnace which is directly coupled to the extrusion press, said furnace comprising a cylindrical, rigid supporting shell $a$ having a reinforcing flange $a'$ at its top, upon which is mounted a roller or ball bearing $a^2$, upon which, in turn, is floatingly supported a bearing ring $a^3$ from which is suspended the furnace shell $a^4$ and upon which ring is supported the furnace shell $a^{14}$, which at its top carries the furnace ring $a^{11}$ which acts as a guide for the top of the melting kettle and for supporting the top insulation $a^8$. Carried by the shell $a^4$ is a fire box $a^5$, the furnace lining $a^6$, the furnace insulation wall $a^7$ and an insulated top $a^8$. Opposite the fire box $a^5$, the furnace is provided with a firing hole $a^9$. Supported by the bearing ring $a^3$ by means of circumferentially spaced lugs or wings B' is a melting kettle B, within which the metal, usually lead or a lead alloy, to be extruded in the press, is adapted to be melted.

Extending into the melting kettle B through the top thereof and preferably eccentrically with respect thereto, is a cylindrical melting chamber $b$, the lower end of which is spaced from the bottom of the kettle and is provided with a grid $b'$, the top of the melting chamber being covered by a charging hood $b^2$ provided with a chain guard $b^3$ which overhangs an inclined charging table $b^4$ provided with rollers $b^5$. For maintaining a non-oxidizing or inert atmosphere above the surface of the molten metal in the kettle B there extends through the top of the furnace $a^8$ into the melting kettle, a pipe or conduit $b^6$ connecting with a source of non-oxidizing or inert gas such as carbon dioxide, the supply of said gas to the melting kettle being controlled by a valve $b^7$. For maintaining the proper pressure for said inert gas within the melting kettle I provide an expansion tank C which connects with the tube $b^6$, said tank C being suitably supported upon brackets $c'$ carried by the frame of the extrusion press. For relieving or venting the pressure from within the melting kettle, there is provided a tube $b^8$ extending through the top of the furnace into said kettle, said tube being provided with a relief valve $b^9$ which may be either manually or automatically operable.

Fitted within the melting kettle B above the bottom thereof and extending substantially horizontally from said kettle through an opening in the furnace wall is a draw-off tube $b^{10}$, the inner end of which extends into the kettle beyond the wall thereof and is provided with a valve seat $b^{11}$, against which a valve D carried by a valve pin $d$ is adapted to seat. Said valve pin screw-threadedly engages through a packed gland $d'$ in the top of the furnace and is provided at its outer end with a hand wheel $d^2$, the rotation of which will either seat or unseat the valve D. The draw-off tube $b^{10}$ at its outer end connects with a passage $e$ in the extrusion press through which the molten metal is conducted to the extrusion cylinder of the press.

The molten metal in the draw-off tube must be maintained in its molten state, and to accomplish this I provide an electric heater F which extends axially through the tube $b^{10}$. I also make use of the heat of the flue gases from the furnace to aid in maintaining the metal in the molten state in the draw-off tube, and with this end in view the draw-off tube $b^{10}$ is enclosed in spaced relation to the wall of a conveyor tube G carried by the furnace and through which the flue gases from the furnace will pass, said conveyor tube being suitably insulated, as indicated at $g$. To provide for the venting of said flue gases from the conveyor tube G, I provide a return or connecting tube H which connects the outer end of the conveyor tube G with the interior of the furnace near the top thereof, whereat said furnace is provided with a vent opening $a^{10}$. The conveyor tube G is mounted in substantially the same horizontal plane as the floating mounting of the furnace, which is preferably mounted approximately midway its height on the supporting shell in order that expansion and contraction of the same, due to temperature differences, will affect the conveyor pipe as little as possible. The mounting is such that the kettle is enabled to expand upwardly from the furnace support and the furnace as a whole can expand downwardly, thereby substantially neutralizing the effects of expansion and contraction.

The molten metal drawn off from the melting kettle through the draw-off tube $b^{10}$ is automatically admitted into the extruding cylinder J of the extrusion press as the extrusion ram $j$ is moved upwardly in said cylinder in making a return stroke as hydraulic pressure fluid is admitted into the backing cylinders K of the press through the pipes $k$ to raise said cylinders, whereby the cross-head $k'$ which carries the ram $j$ is elevated. Simultaneously with the applying of hydraulic pressure to the backing cylinders K, hydraulic pressure is supplied to a valve operating cylinder L which is carried by the press to move a plunger $l$ outwardly through said cylinder. The outer end of the plunger $l$ is connected at $l'$ to a lever M, the end $m$ of which is rockingly connected to the hub of a control wheel $e^2$ fixed to a valve rod $e'$, which, at its inner end carries the valve E which controls the admission of molten metal from the duct $e$ to the extrusion cylinder J. At its other end the lever M is pivotally connected at $m'$ to one end of a slide rod N, the other end of which carries a cross-piece $n$ having a pair of spaced pins $n'$ extending parallel to the rod N and extending through guide openings in a cross-head $n^2$ which is fixedly carried by a pair of rods $n^3$ rigidly mounted on the press frame. Encircling said pins $n'$ between the cross-piece $n$ and cross-head $n^2$ are compression springs $n^4$. Between the pivotal mounting $l'$ and the end $m$ of the lever M, said lever is pivotally connected at $m^2$ to one end of a link O, the other end of which is pivotally connected to a lug $o$ secured to the press frame.

It will thus be seen that as the plunger $l$ moves outwardly in its cylinder L upon the admission of pressure fluid thereinto, the valve rod $e'$ is moved inwardly to unseat the valve E, thus opening communication between the duct $e$ and the extrusion cylinder J. Upon opening the hydraulic supply from the backing cylinder K to waste, and admitting pressure fluid into the pressure cylinder P of the press to move the piston $p$ and the ram $j$ connected thereto downwardly, the interior of the valve operating cylinder L will also be open to waste, whereupon the springs $n^4$ will act upon the slide rod N to move the same inwardly, thereby moving the plunger $l$ into the cylinder L and the valve rod $e$ outwardly to close the valve E.

As the ram $j$ is moved downwardly the valve E will be closed, thus preventing the molten metal from escaping from the chamber except through the discharge opening $j'$ in the extrusion cylinder, through which the molten metal will be forced into the extrusion chamber R of the die-block S. To prevent escape of molten metal through the top of the extrusion cylinder the latter is provided with a gland T which is screw-threaded into the outer end of the extrusion cylinder, the inner surface of said gland being provided with a plurality of concentric conical recesses $t$ (as best shown in Fig. 4) for receiving and retaining any molten metal which may be forced into said gland. This gland is preferably cooled to a temperature substantially below the melting point of the metal being extruded, so that any metal caught within the recesses $t$ will solidify therein and serve as a packing for preventing the molten metal extruding through said gland. For cooling the gland it may be provided at its inner wall near the top thereof with an annular recess $t^2$ through which water may be circulated through the pipes $t^3$ and $t^4$. To further cool the gland below its top, the extrusion cylinder J may be provided at its portion encircling said gland with water-circulating passages $t^5$ and connecting pipes $t^6$ and $t^7$. For maintaining the extrudable metal in the extrusion cylinder below the gland T in molten condition, said cylinder may be provided with a plurality of electric heating units U which encircle said cylinder. Thermostat control means may be inserted in openings $u$ for automatically controlling the current supplied to said heating units U to maintain the proper temperature in the extrusion cylinder. Said cylinder and heating units may be suitably insulated, as indicated at $u'$, said insulating means being enclosed within a casing $u^2$.

The extrusion cylinder J at its lower end is formed with a conical surface which terminates in a reduced cylindrical nipple-like portion which is further reduced at its extreme end to provide a shoulder, between which and a corresponding shoulder on the die-block S at the entrance to the extrusion chamber therein there is provided a sealing ring V for sealing the space between the extrusion cylinder and the extrusion chamber R. Preferably the diameter of this ring V is made considerably smaller than the diameter of the extrusion ram $j$ whereby the extrusion pressure in the extrusion cylinder will provide an increased pressure on the sealing ring. In addition to this pressure the extrusion cylinder is secured to the die-block through the medium of volts $v$. The extrusion ram $j$ is also preferably of somewhat smaller diameter than the interior diameter of the extrusion cylinder so as to prevent scoring of the chamber therein.

The die-block S preferably consists of concentric members $s$ and $s'$, respectively, suitably secured together, the member $s$ being cored out to provide the extrusion chamber R therein. Extending into the extrusion chamber is a core W comprising a master core $w$, a core tip $w'$ adjustable in the master core through a core nut $w^2$, the master core being provided with a nonferrous bushing $w^3$ to prevent scoring of the core tip during adjustment within the core. For holding the master core in position within the die-block, a master core nut $w^4$ is provided.

Extending into the opposite end of the die-block S is a die holder X held within the die-block by a securing nut $x$. Screw-threadedly mounted within the die holder X is a die nut $x'$, which at its inner end carries the extruding die $x^2$. The die holder X has at its inner end a bearing flange $x^3$, against which bear the inner ends of adjusting bolts Y, by means of which the die $x^3$ can be eccentrically adjusted with respect to the axis of the die-block so as to position the die in true concentric relation to the end of the core tip $w'$ to compensate for deflections which might take place in said core tip. Within the die-block S at the core tip end of the extrusion chamber therein there is provided an annular ring $s^2$ having a conical inner face which provides a continuation of the curved inner wall of the extrusion chamber, said ring having a close fit with both the die-block sections $s$ and $s'$ and the ends of the die holder X and die nut $x'$, and serves to prevent the extruding metal from jamming the die holder X.

To maintain the extruding metal in molten condition within the extrusion chamber R in advance of the core tip, there are provided a plurality of electric heating units (not shown) in chambers Z which extend longitudinally of the die-block in spaced relation around the core. At the extrusion end of the extrusion chamber, that is, near the extruding die $x^2$ and around the core tip $w'$, it is desirable that the extrudable metal be in the solidified or congealed state, and to bring this about the die-block in encircling relation to the core tip is provided with a chamber $s^3$ through which cooling water may flow or circulate. It is important that the proper difference in temperature between the molten metal at the entrance end of the extrusion chamber and the congealed metal at the extruding end of said chamber be maintained, and to accomplish this I provide at longitudinally spaced points of the die-block in proximity to the extrusion chamber, thermostat openings $s^4$ provided with means (not shown) for automatically closing and opening the circuit supplying current to the electric heater units Z. Where the metal being extruded is lead, the temperature to be maintained within the extrusion chamber at the entrance thereof should be 650° F., at the core tip end of said chamber approximately 350° C. and at a point approximately midway between said entrance and extruding end of said chamber, approximately 500° C.

It is desirable and highly important to protect the insulated cable Q from the heat of the molten metal in the extrusion chamber which passes through the core therein immediately before the extruding metal is applied as a jacket over said cable, and to accomplish this I provide a cooling chamber within the master core $w$ surrounding the core nut $w^2$ at the entrance end of the extrusion chamber, and in this space I fit a spacer tube $w^5$ in concentric relation to the core nut, thereby dividing said chamber into two concentric chambers. These chambers are placed in communication with each other through openings $w^6$, and communication with these chambers is established through the longitudinal openings $w^7$ in the core nut and openings $w^8$ in the master core. For providing the cooling atmosphere around said cable, air or other cooling fluid may be introduced into the inner of the two concentric chambers through the pipe connection $w^9$, which cooling fluid, after traversing the length of the inner chamber, will pass through the openings $w^6$ in the spacer tube into the outer chamber and out through the opening $w^8$.

In the operation of the extrusion apparatus, let us assume that the melting kettle B is full of molten metal to the level indicated in Fig. 1, which level can be maintained by charging additional metal in the form of pigs into the melting chamber $b$ over the roller table $b^4$ as molten metal is withdrawn from the melting kettle. The molten metal in the kettle is kept free from oxidation by maintaining an atmosphere of inert gas, such as carbon dioxide, above the surface of the molten metal, and any dirt or oxides given off during the melting operation of the pigs will rise to the surface within the melting chamber $b$, wherefrom they can be readily removed.

Figure 2:
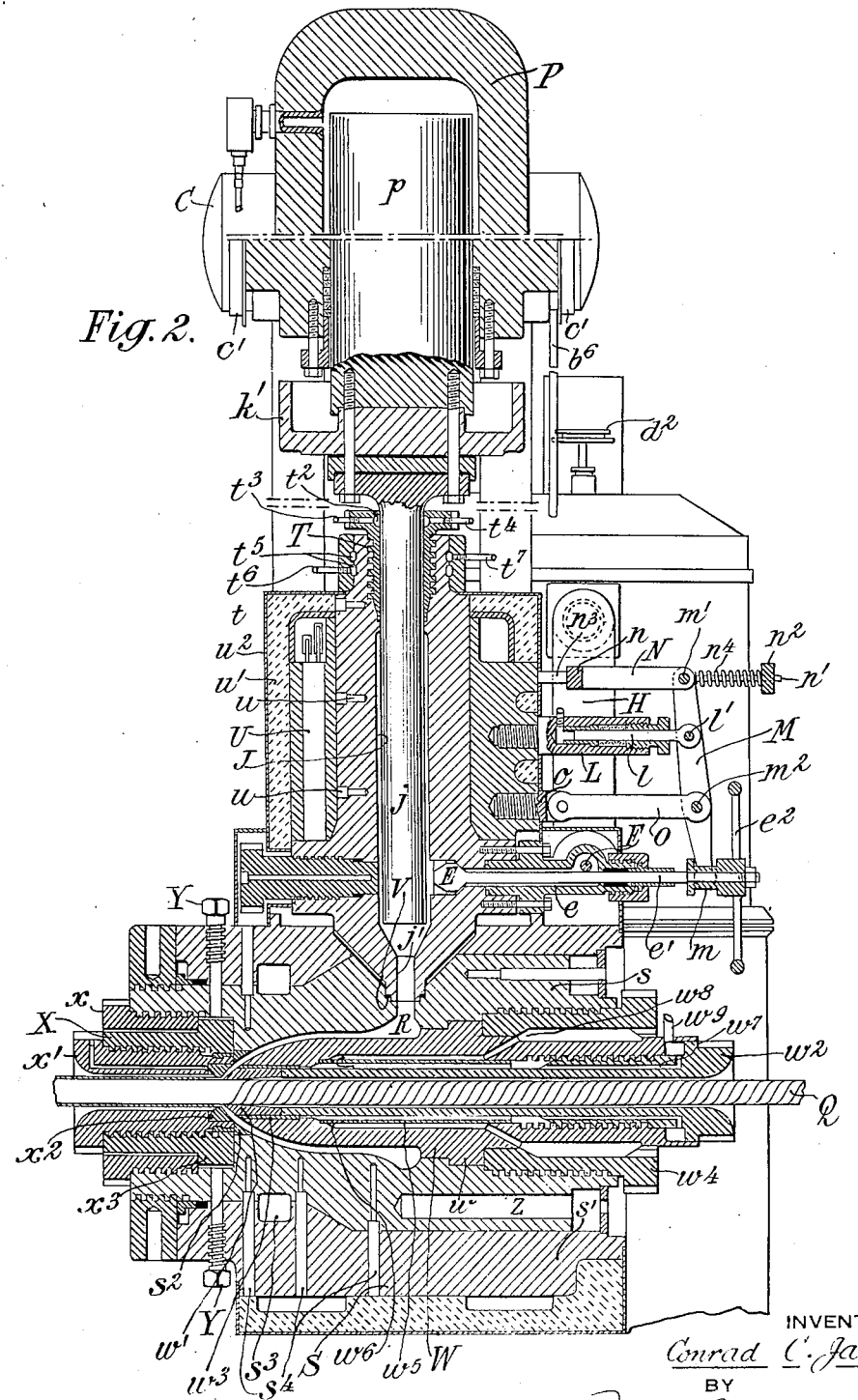
Fig. 2 is a vertical section taken substantially along the plane of the line 2—2 of Fig. 1.

By opening the valve D by means of rotating the hand wheel $d^2$ in a counterclockwise direction, the molten metal will flow through the charging tube $b^{10}$ and be maintained therein in molten condition by the electric heater F. From said draw-off tube said molten metal will flow into the duct $e$ leading to the valve E. With the extrusion ram $j$ in its lowermost position, as shown in Fig. 2, hydraulic pressure is applied to the valve operating cylinder L and to the backing cylinders K, whereupon the valve E will be automatically opened, admitting the molten metal into the extrusion cylinder J and extrusion chamber R as the extrusion ram moves upwardly. Now by reversing the hydraulic pressure, that is, by opening the backing cylinders K and valve operating cylinder L to waste and applying hydraulic pressure to the piston $p$ within the pressure cylinder P, the extrusion ram will move downwardly, exerting a pressure upon the molten metal in both the extrusion cylinder and extrusion chamber and extruding said metal from the latter around the core tip $w'$ past the extrusion die $x^2$ to jacket the cable Q which is being fed through the die-block. As hereinbefore stated, the metal, before reaching the extrusion die, is congealed or solidified by cooling the chamber in advance of the core tip by circulating cooling fluid through the duct $s^3$. In view of the fact that the extruding metal within the extrusion chamber is maintained in a liquid state prior to being congealed or solidified around the core in advance of the extrusion die, it will be apparent that by means of my present apparatus one is enabled to produce cable sheathing entirely free from both longitudinal and transverse welds or joints, which sheathing will also be free from oxide contamination since the oxide-free metal is delivered from the melting kettle to the extrusion die without being brought into contact with any contaminating or oxidizing influences.

From the foregoing detailed description it will be accordingly appreciated that I have provided a novel apparatus and method for producing weldless cable sheathing, which apparatus is of relatively simple construction, semi-automatic in operation, and one which will produce in a highly efficient manner cable sheathing of superior qualities than has heretofore been possible of production, and while I have shown and described a single preferred embodiment of my invention, it will be understood that the same may be modified or changed within the range of engineering skill without departing from the spirit of said invention.

I do not herein claim certain novel features of construction disclosed in the present application, with particular regard to the melting kettle and the die-block, since these are more particularly described and claimed in my co-pending applications Serial Nos. 626,442, filed July 30, 1932, and 628,459, filed August 12, 1932.

What I claim is:

1. An extrusion press comprising a cylinder adapted to receive molten metal, a ram movable in said cylinder, and a gland in said cylinder for preventing the escape of molten metal from the cylinder around the ram when said cylinder is subjected to pressure in said cylinder, said gland having a metal entraining groove in its inner wall adapted to receive molten metal that is forced up into said gland around the ram, an annular groove in its inner wall outwardly of the metal entraining groove through which cooling fluid can circulate, and means for cooling said gland below the temperature of the molten metal whereby to congeal the metal entrained in said groove so that it will act as a packing for preventing molten metal from extruding through the gland.

2. In combination an extrusion press, comprising a cylinder, a reciprocable ram movable in said cylinder, fluid pressure means operating the ram, a supply of molten metal, valve means controlling the admission of said molten metal to the cylinder of the press, and means operable by the fluid pressure when operating the ram for controlling said valve to admit metal into the cylinder as the ram in said cylinder starts upwardly therein on its return stroke and for shutting off such admission of metal as the ram begins its downward or extruding stroke.

3. In combination an hydraulically operable extrusion press, comprising a cylinder, a reciprocable ram movable in said cylinder under the influence of fluid pressure, a supply of molten metal, a passage leading from said supply means to said cylinder, a valve in said passage controlling the admission of said molten metal to the cylinder of the press, and valve control means operable by the fluid pressure when operating the ram for controlling said valve, said valve control means comprising an operating cylinder which is connected with the fluid pressure supply to the backing cylinder of the press and functions to open the valve means when the backing cylinder and the operating cylinder are receiving hydraulic pressure and to close said valve when the hydraulic supply to the backing cylinder and operating cylinder are opened to waste.

4. The combination as set forth in claim 3, wherein the valve has a valve stem and the operating cylinder has a piston which is operatively connected to the valve stem through a lever, and spring means serving to move the piston in its cylinder to expel the hydraulic fluid therefrom when the hydraulic supply to the operating cylinder is opened to waste.

5. In combination, an extrusion press, a melting kettle for the extrudable metal, a pipe for conveying the molten metal from the kettle to the press and means for heating said pipe for maintaining the metal therein and passing therethrough in its molten state, said heating means comprising electrical heating means extending into the duct in the conveyor pipe through which the molten metal flows.

6. An extrusion press for sheathing cable with a metal jacket comprising a die-block having an extrusion chamber therein adapted to receive molten metal, a core within said extrusion chamber, said core comprising a pair of tubular elements disposed in substantially concentric spaced relation for the greater part of their lengths, a spacer tube in the annular space between said core parts dividing said space into two chambers, said spacer tube having holes therein in proximity to the core tip end thereof establishing communication between said chambers and providing for the circulation of cooling fluid therethrough.

CONRAD C. JACOBSON.